(12) United States Patent
Han et al.

(10) Patent No.: US 8,430,780 B2
(45) Date of Patent: Apr. 30, 2013

(54) SUPPORT STRUCTURE FOR DIFFERENTIAL

(75) Inventors: Zhipeng Han, Canton, MI (US); Greg Sabourin, Spring Arbor, MI (US); Robert Veldman, Brighton, MI (US); William F. Cockrum, West Bloomfield, MI (US); Sanjay Sarnaik, Ashburn, VA (US)

(73) Assignee: Metaldyne Company LLC, Plymouth, MI (US)

( * ) Notice: Subject to any disclaimer, the term of this patent is extended or adjusted under 35 U.S.C. 154(b) by 1081 days.

(21) Appl. No.: 12/220,028

(22) Filed: Jul. 21, 2008

(65) Prior Publication Data
US 2009/0075777 A1    Mar. 19, 2009

Related U.S. Application Data

(60) Provisional application No. 60/961,250, filed on Jul. 19, 2007.

(51) Int. Cl.
*F16H 48/06* (2006.01)

(52) U.S. Cl.
USPC .......................................................... 475/230

(58) Field of Classification Search .................... 475/230
See application file for complete search history.

(56) References Cited

U.S. PATENT DOCUMENTS

| | | | |
|---|---|---|---|
| 1,226,854 A | 5/1917 | Bower | |
| 1,308,614 A | 7/1919 | Baldock | |
| 2,720,797 A | 10/1955 | Huddleston et al. | |
| 3,310,999 A | 3/1967 | Griffith | |
| 3,651,713 A | 3/1972 | Mueller | |
| 3,955,443 A | 5/1976 | Estrada | |
| 4,363,248 A | 12/1982 | Brisabois | |
| 4,722,244 A | 2/1988 | Tsuchiya et al. | |
| 4,848,183 A | 7/1989 | Ferguson | |
| 6,254,505 B1 | 7/2001 | Forrest | |
| 7,025,702 B2 | 4/2006 | Saito et al. | |
| 7,155,997 B2 * | 1/2007 | Santelli | 74/607 |
| 7,901,318 B2 * | 3/2011 | Downs et al. | 475/230 |
| 7,951,037 B2 * | 5/2011 | Sudorowski et al. | 475/230 |
| 2005/0070394 A1 | 3/2005 | Sugeta et al. | |

* cited by examiner

*Primary Examiner* — Ha D. Ho
(74) *Attorney, Agent, or Firm* — McDonald Hopkins LLC

(57) ABSTRACT

A support structure for a differential assembly comprising: a support ring having a peripheral wall extending between a first face and a second face, the support ring having a non-hollow center; a bore in the peripheral wall sized and shaped to receive a pinion shaft; and an aperture in the first face, the second aperture in fluid communication with the first aperture.

8 Claims, 6 Drawing Sheets

SUPPORT STRUCTURE FOR DIFFERENTIAL

CROSS-REFERENCE TO RELATED APPLICATIONS

This application claims benefit from U.S. Provisional Patent Application No. 60/961,250, entitled "Support Structure for Differential," filed on Jul. 19, 2007, which is hereby incorporated in its entirety by reference.

FIELD OF THE INVENTION

The present invention generally relates to mechanical differentials, and more particularly to a support structure for supporting one or more pinion shafts in a mechanical differential.

BACKGROUND OF THE INVENTION

Differential assemblies are known in the automotive industry as devices that split engine torque two ways, allowing each output to spin at a different speed. Generally, differential assemblies have three primary tasks: to aim the engine power at the wheels; to act as the final gear reduction in the vehicle, slowing the rotational speed of the transmission one final time before transmission to the wheels; and to transmit the power to the wheels while allowing them to rotate at different speeds.

A typical mechanical differential contains a housing (or carrier), two side gears, and several pinion gears. A rotating driveshaft of the vehicle engages a ring gear, which is mounted onto the differential housing. The driveshaft drives the ring gear, which in turn rotates the differential housing. Pinion shafts attach the pinion gears to the housing so that, as the housing rotates, the pinion gears are driven. The pinion gears drive the two side gears, which in turn drive the axle (or half shafts) attached thereto.

The pinion shafts of the differential assembly typically have a support ring that secures to the inward ends of pinion shafts so that the torque of the housing can be transmitted to the pinion shafts and thereby drive the pinion gears. The pinion gears spin upon the pinion shafts and rotate about the axis of the housing.

The conventional support ring is typically a ring-type component having a hollow center with a plurality of apertures provided through the wall of the support ring for receiving the ends of the pinion shafts. This type of support ring is usually made from a hollow tube or pipe. In some cases, the required size of the support ring does not correspond to the size of the standardized tube material supplied in the market. In such cases, manufacturers have been forced to use solid bars that correspond to the required size of the support ring. However, solid bars generally have to be substantially machined to create rings. As such, a large amount of material has to be machined to form a hollow support ring having the required dimensional characteristics.

With reference to FIGS. 1A and 1B, typical mechanical differentials contain a housing 1, two side gears 3, and several pinion gears 4. The pinion gears 4 are fixed to the housing 1 by a pinion shaft 5 so that the pinion gears 4 may be driven by the housing 1 to rotate around the housing 1 while spinning on the pinion shafts 5. Typically, the pinion shafts 5 are rigidly secured to the housing 1 at their respective distal ends, and supported by a support ring 6 at their respective proximal ends. Torque is transmitted to the housing 1, and the housing 1 drives the pinion shafts 5 which in turn drives the pinion gears 4. As the pinion gears 4 move, the pinion gears 4 drive the side gears 3 so that torque may be transmitted to the side gears 3.

FIGS. 2A-2E illustrates a conventional support ring 6 having an outer surface 11 and inner surface 13, with the inner surface 13 defining a hollow center. Typically, three apertures 10 are machined through the outer surface 11 and the inner surface 13 of the support ring 6 to provide connections for the pinion shafts.

During operation of the differential assembly, friction and heat are generated as components within the differential housing are engaging and contacting one another. This friction and heat reduces the durability and load carrying capacity of the differential assembly, such as by causing scoring damage to the contact surfaces. Consequently, in most applications, the differential assembly must guide lubricant to the various frictional surfaces to relieve friction and minimize the generation of heat.

For example, the contact surfaces of the pinion gear bore and pinion shaft 5 are among the important surfaces that require significant lubrication. In many applications, the lubricant for lubricating these surfaces is supplied to the differential through shaft bores 17 and corresponding splined bores 18 of the side gears 3. Under the effect of centrifugal force generated when the differential is rotating, the lubricant flows inwardly thru the shaft bores 17 and splined bores 18, and the lubricant is collected by the inner surface 13 of support ring 6. The lubricant then flows through the clearance between the bores 10 of the support ring 6 and flat features 19 of each pinion shaft 5 to a corresponding interface of the contact pair of the pinion gear bore and pinion shaft 5.

Consequently there exists a significant need for a pinion shaft support structure that is capable of providing lubrication pathways to the interface of the pinion gear bores and pinion shafts, while also capable of reducing the time and expense in machining the support structure thereby resulting in reduced manufacturing costs.

DESCRIPTION OF THE DRAWINGS

Objects and advantages together with the operation of the invention may be better understood by reference to the following detailed description taken in connection with the following illustrations, wherein like numerals indicate like elements throughout, and wherein.

DETAILED DESCRIPTION

Figure 1A:
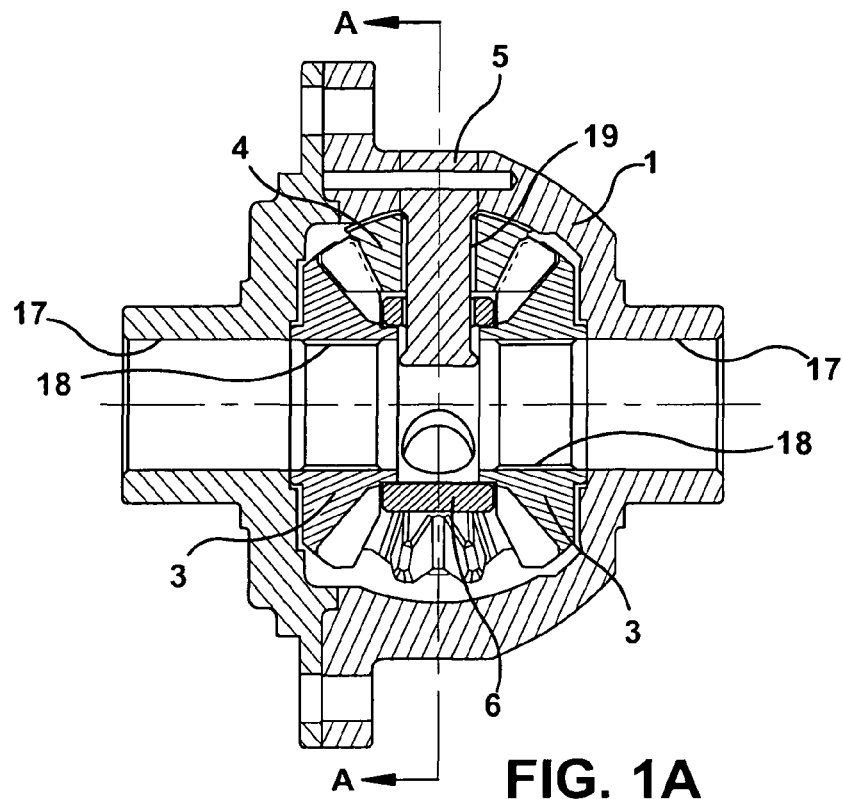
FIG. 1A illustrates a differential housing assembly which is generally known in the art.
Figure 1B:
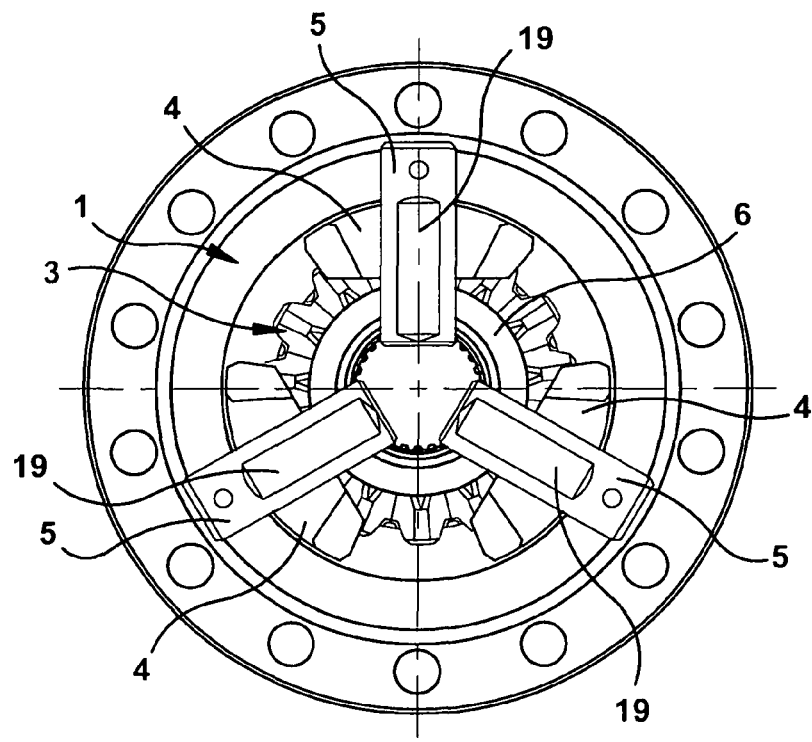
FIG. 1B illustrates a cross-sectional view of the differential housing assembly of FIG. 1A taken along line A-A.
Figure 2B:
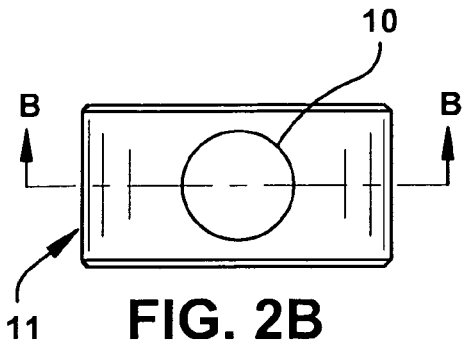
FIG. 2B is a top view of the support ring of FIG. 2A.
Figure 2D:
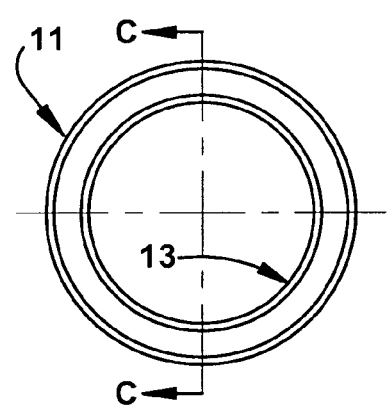
FIG. 2D is a side view of the support ring of FIG. 2A.
Figure 2A:
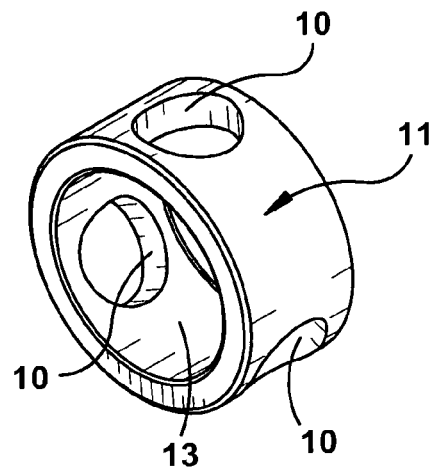
FIG. 2A is a perspective view of a support ring generally known in the art.
Figure 2C:
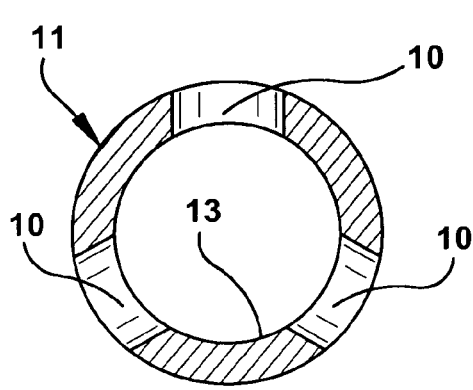
FIG. 2C is a cross-sectional view of the support ring of FIG. 2B taken generally along line B-B.
Figure 2E:
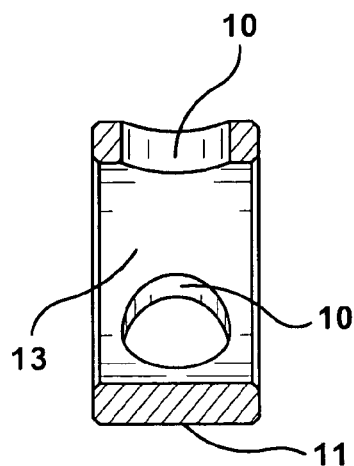
FIG. 2E is a cross-sectional view of the support ring of FIG. 2D taken generally along line C-C.
Figure 3B:
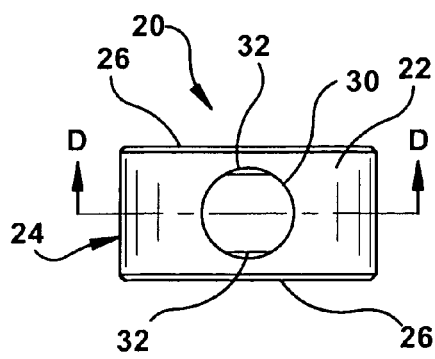
FIG. 3B is a top view of the support ring of FIG. 3A.
Figure 3A:
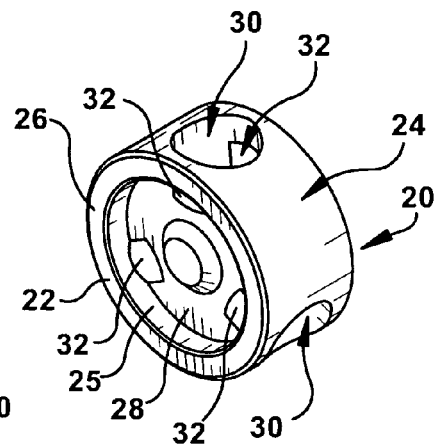
FIG. 3A is a perspective view of a support ring in an embodiment of the present invention.
Figure 3D:
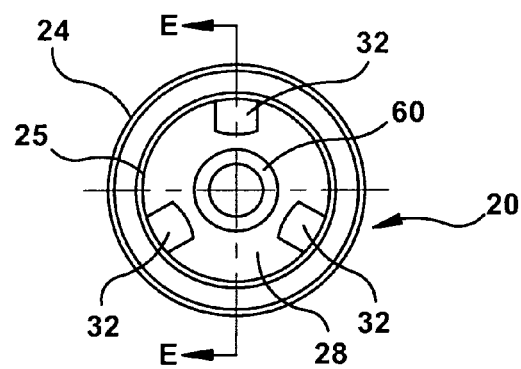
FIG. 3D is a side view of the support ring of FIG. 3A.
Figure 3C:
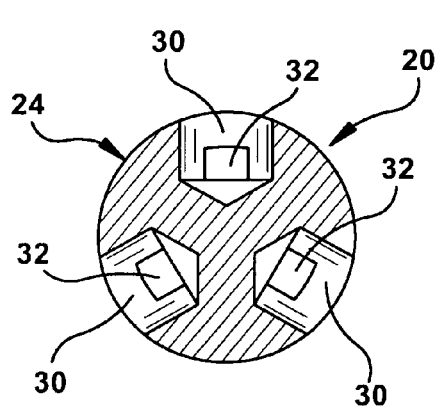
FIG. 3C is a cross-sectional view of the support ring of FIG. 3B taken generally along line D-D.
Figure 3E:
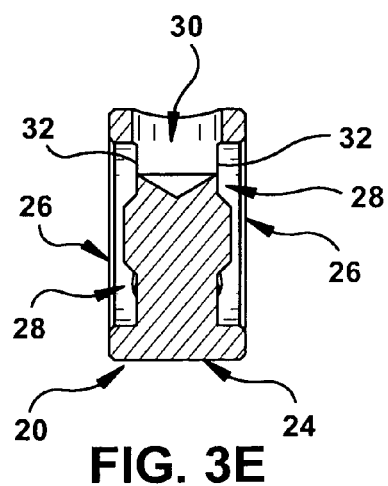
FIG. 3E is a cross-sectional view of the support ring of FIG. 3D taken generally along line E-E.

While the present support structure is described with reference to several embodiments described herein, it should be clear that the present invention should not be limited to such embodiments. Therefore, the description of the embodiments provided herein are illustrative of the present invention and should not limit the scope of the invention as claimed.

Reference will now be made in detail to an embodiment of the invention as illustrated in accompanying FIGS. 3A-3E. In accordance with the embodiment, a support structure 20 is generally illustrated. For example, the support structure 20 may consist of a support ring 22 capable of use in a differential assembly. The shape of the support ring 22 should not be deemed as limited to any specific shape. The support ring 22 may correspond to the shape of the differential housing, for example.

In an embodiment, the support ring 22 may generally be manufactured from a rod material, such as a non-hollow bodied metal rod material. Use of the non-hollow rod material can provide manufacturing cost savings, especially when used to manufacture the support rings 22 having required dimensions different from typical hollow, rod dimensions and similar to the dimensions of non-hollow rod dimensions. In such an embodiment, the present invention permits a reduced amount of machining and, as a result, a cost savings.

As shown in FIGS. 3A-3E, the support ring 22 may comprise an outer wall 24 and an inner wall 25 extending between faces 28 of the sidewalls 26. In an embodiment, the support ring 22 may be annular and cylindrical. The faces 28 may be recessed, such as by machining the faces 28 a predetermined distance within the sidewalls 26. For example, a non-hollow tube material may be cut into sections to form the support ring 22, and the faces 28 may be machined into the sidewalls 26. One of ordinary skill in the art will appreciate other methods for forming the recessed sidewalls 26, including but not limited to casting, such as die casting.

Figure 4A:
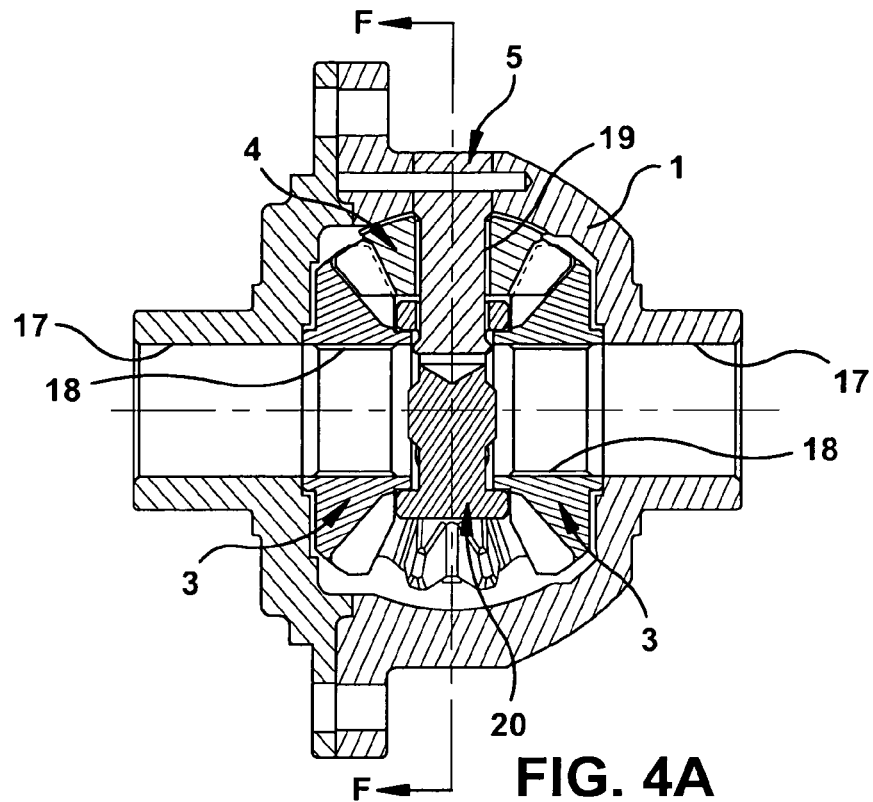
FIG. 4A illustrates the support ring of FIG. 3A incorporated into a mechanical differential assembly in an embodiment of the present invention.
Figure 4B:
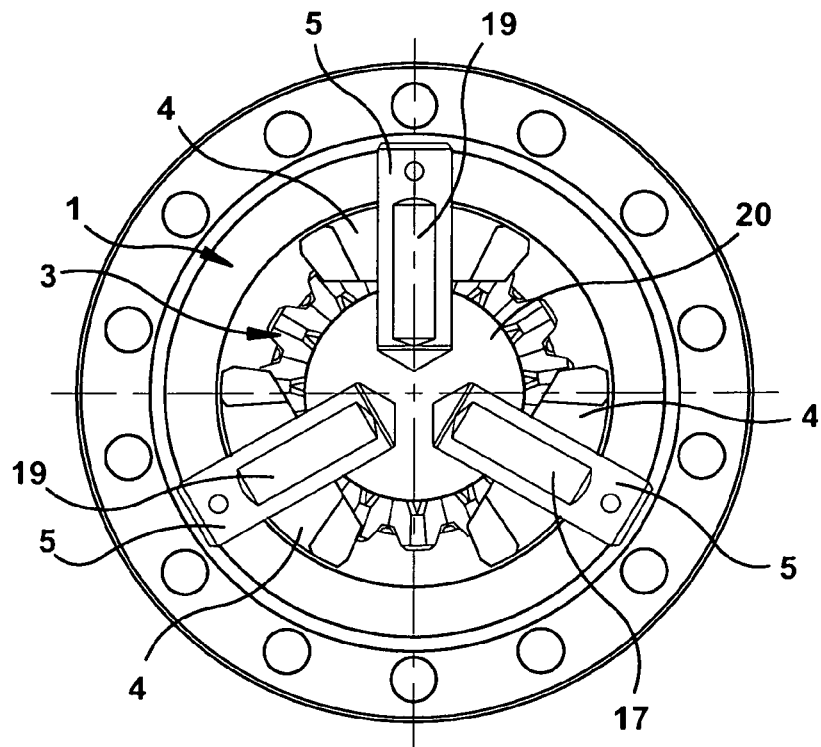
FIG. 4B is a cross-sectional view of the differential assembly of FIG. 4A taken generally along line F-F.
Figure 5B:
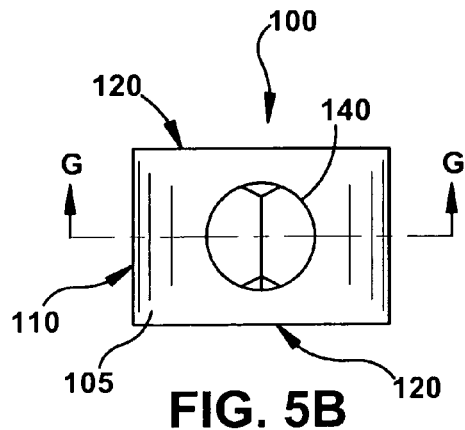
FIG. 5B is a top view of the support ring of FIG. 5A.
Figure 5A:
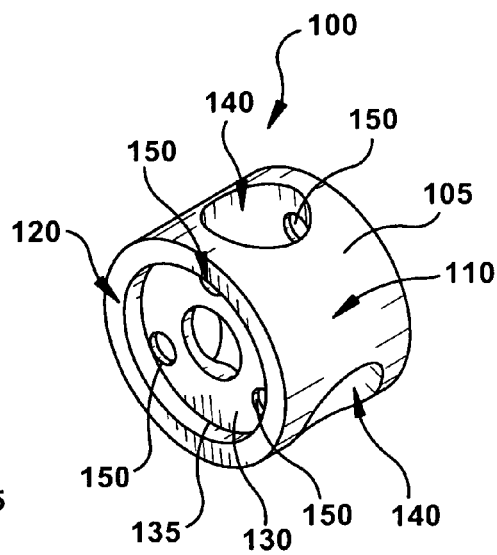
FIG. 5A is a perspective view of a support ring in another embodiment of the present invention.
Figure 5D:
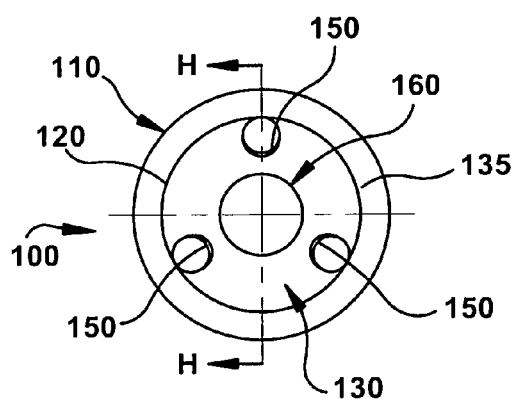
FIG. 5D is a side view of the support ring of FIG. 5A.
Figure 5C:
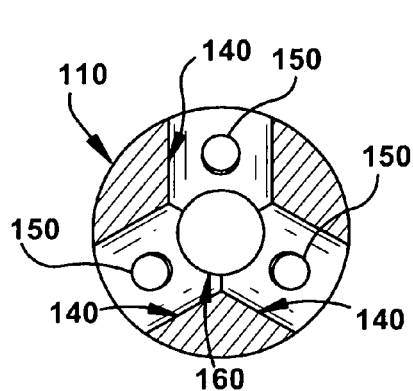
FIG. 5C is a cross-sectional view of the support ring of FIG. 5B taken generally along line G-G.
Figure 5E:
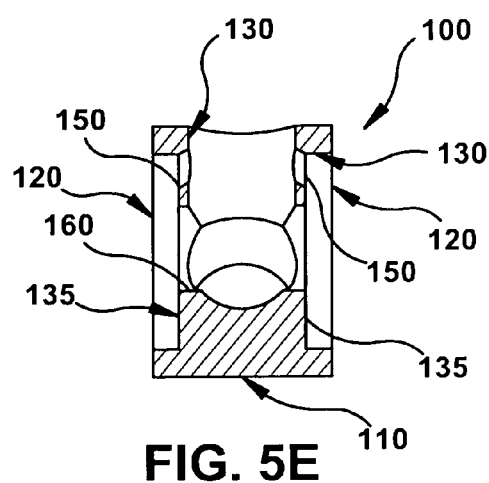
FIG. 5E is a cross-sectional view of the support ring of FIG. 5D taken generally along line H-H.

A plurality of bores 30 may be machined into the outer wall 24 so that the inner ends of a plurality of pinion shafts, such as pinion shafts 5 shown in FIGS. 4A and 4B, may be supported therein. The bores 30 are machined such that the bores 30 extend a predetermined distance within the support ring 22, such as a predetermined distance toward the center of the support ring 22. The dimensions of the bores 30 may correspond to and/or may be substantially similar to the pinion shafts that may be supported therein. For example, in order to support cylindrical pinion shafts, the bores 30 may be circular and have at least a diameter equal to the pinion shafts 5.

Windows (or apertures) 32 may be formed in the faces 38 of the support ring 22. The windows 32 may permit fluid communication with the faces 28 and the bores 30. The windows 32 may be smaller in size than the bores 30. It should be realized that the configuration of the support structure 20, or any features thereof, may be machined from a solid or non-hollow body of any suitable shape or material; alternatively, the support structure 20, or any features thereof, may be molded from powdered metal, a durable polymer, a composite material, or the like. Additionally, while the illustrative embodiment shows three bores 30 for supporting three pinion shafts 5, it will be appreciated that any number of apertures for supporting any number of pinion shafts may be utilized.

The windows 32 may be cut into or otherwise formed into the faces 28 of the support ring 22 such that lubricant coming from the center holes of the side gears 3 may flow into the faces 28 and into the bores 30 to reach the pinion shafts 5. For example, if the support ring 22 is incorporated into the differential housing 1 of FIGS. 4A and 4B, centrifugal force of the components of the differential housing 1 along with the surface tension of the lubricant may aid in permits lubricant to flow through the bores 30 and on the pinion shafts 5. Lubrication of the pinion shafts 5 is typically needed or at least desirable between the inner bore of the pinion gears and pinion shafts 5. The windows 32 may be used to aid in removing or assembling the pinion shafts 5 from or into the support structure 20.

One of ordinary skill in the art will appreciate various methods for manufacturing the support ring 22. For example, one method may involve providing a non-hollow material, cutting the material into a desired thickness defined between the sidewalls 26, and machining the faces 28 into the sidewalls 26. In another embodiment, the support ring 22 may be cast into the desired thickness as a non-hollow material. In such an embodiment, if it is desired to have the faces 28 recessed into the sidewalls 26, recesses may be machined into the sidewalls 26 or the faces 28 may be cast in such a manner. One or more of the bores 60 and one or more of the windows 32 may be machined, cast or otherwise formed into the outer wall 24 of the support ring 22.

Figure 6A:
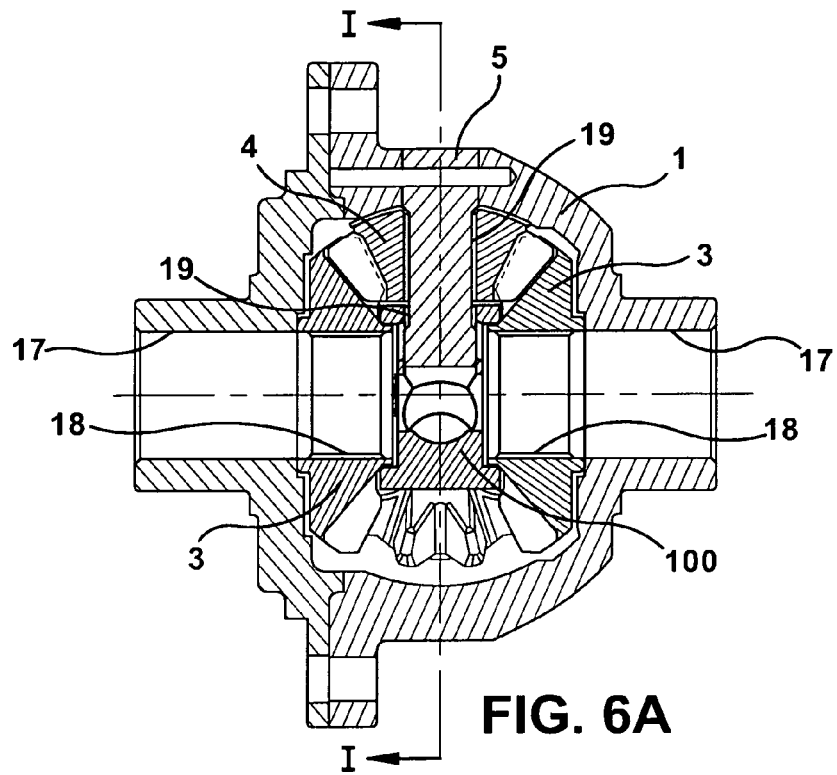
FIG. 6A illustrates the support ring of FIG. 5A incorporated into a mechanical differential assembly in an embodiment of the present invention.
Figure 6B:
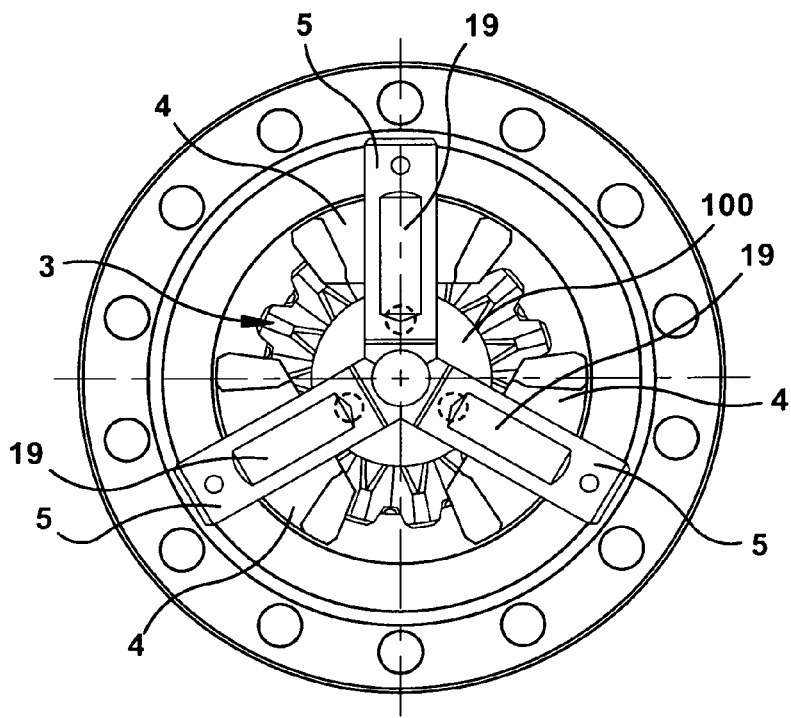
FIG. 6B is a cross-sectional view of the differential assembly of FIG. 4A taken generally along line I-I.

FIGS. 5 and 6 illustrate an alternative embodiment of a support structure 100. The support structure 100 comprises a generally non-hollow body 105 having side walls 120 extending between an inner wall 135 and an outer wall 110. The side walls 120 may have faces 130, which may be recessed toward the opposing sidewall 120. The outer wall 110 may include one or more bores 140, each capable of supporting the proximal end of a corresponding pinion shaft 5.

The faces 130 may have one or more apertures (or windows) 150 for providing fluid communication to the bores 140. While the apertures 150 are illustrated as having circular cross-sections, it should be appreciated that any suitable cross-sectional shape may be employed, including but not limited to triangular, square, rectangular, hexagonal, octagonal, or the like. A hole 160 may also be included in the faces 130 to assist in the assembly and disassembly of the differential. In an embodiment, the hole 160 may be used similar to the apertures 150, preferably only if the hole 150 terminates within the body of the support structure 100.

It should be realized that the configuration of the support structure 100, or any features thereof, may be machined from a non-hollow body of any suitable shape or material; alternatively, the support structure 100, or any features thereof, may be molded from powdered metal, a durable polymer, a composite material, or the like. Additionally, while the illustrative embodiment shows three bores 140 for supporting three pinion shafts 5, it will be appreciated that any number of apertures for supporting any number of pinion shafts may be utilized.

Referring again to FIGS. 5 and 6, the apertures 150 permit lubrication coming from the center holes of the side gears 3 to flow from the annular pockets 130 to the pinion shafts 5. With the help of centrifugal force and surface tension, the lubricant may flow along the pinion shafts 5 into the interface between the inner bore of the pinion gears and pinion shafts to improve lubrication therebetween.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A support structure for a differential assembly comprising:
    a support ring having a peripheral wall extending between a first face and a second face, the support ring having a non-hollow body;
    a bore in the peripheral wall sized and shaped to receive a pinion shaft;
    a first aperture in the first face and a second aperture in the second face, the second aperture in fluid communication with the first aperture; and
    wherein the first face is recessed into the support ring.

2. The support structure of claim 1 wherein the support ring is machined from a non-hollow material.

3. The support structure of claim 1 wherein the support ring is die cast.

4. The support structure of claim 1 wherein the first aperture is smaller in size than the bore.

5. The support structure of claim 1 wherein the bore is circular and extends a predetermined distance toward the center of the support ring.

6. The support structure of claim 1 wherein the bore terminates into the non-hollow body of the support ring.

7. A differential housing assembly comprising:
    a pinion shaft;
    a support ring having an outer wall and a non-hollow body, the support ring having a bore formed in the outer wall for receiving at least a portion of the pinion shaft, wherein the support ring has a first aperture and second aperture in fluid communication with the bore; and
    wherein the bore extends toward the center of the support ring and terminates within the non-hollow body of the support ring.

8. The differential housing assembly of claim 7 further comprising:
    one or more pinion gears attached to the pinion shafts.

* * * * *